United States Patent
Hahn

(10) Patent No.: US 8,196,733 B2
(45) Date of Patent: Jun. 12, 2012

(54) ARTICLE BUFFER

(75) Inventor: Wolfgang Hahn, Donaustauf (DE)

(73) Assignee: Krones AG, Neutraubling (DE)

( * ) Notice: Subject to any disclaimer, the term of this patent is extended or adjusted under 35 U.S.C. 154(b) by 6 days.

(21) Appl. No.: 12/810,063

(22) PCT Filed: Dec. 4, 2008

(86) PCT No.: PCT/EP2008/010298
§ 371 (c)(1),
(2), (4) Date: Jul. 29, 2010

(87) PCT Pub. No.: WO2009/080184
PCT Pub. Date: Jul. 2, 2009

(65) Prior Publication Data
US 2010/0294619 A1    Nov. 25, 2010

(30) Foreign Application Priority Data

Dec. 24, 2007    (DE) .......................... 10 2007 062 652

(51) Int. Cl.
*B67C 3/24* (2006.01)
(52) U.S. Cl. ..................... 198/367; 198/347.4; 198/436; 198/437; 198/443; 198/454; 198/576
(58) Field of Classification Search ............... 198/347.1, 198/347.4, 355, 367, 436, 437, 443, 444, 198/445, 451, 452, 454, 575, 576, 617
See application file for complete search history.

(56) References Cited

U.S. PATENT DOCUMENTS

| | | | | |
|---|---|---|---|---|
| 4,003,465 A | * | 1/1977 | Bauer | 198/442 |
| 4,142,636 A | | 3/1979 | Planke | |
| 4,496,040 A | * | 1/1985 | Kronseder et al. | 198/434 |
| 4,768,643 A | * | 9/1988 | Lenhart | 198/453 |
| 4,944,635 A | | 7/1990 | Carlier et al. | |
| 5,170,879 A | * | 12/1992 | Smith | 198/452 |
| 5,282,525 A | * | 2/1994 | Covert | 198/347.1 |
| 5,353,915 A | * | 10/1994 | Schneider | 198/447 |
| 5,372,277 A | * | 12/1994 | Waring | 221/68 |
| 5,460,257 A | * | 10/1995 | Yoshida | 198/358 |
| 5,551,551 A | * | 9/1996 | Crawford | 198/453 |
| 5,944,165 A | * | 8/1999 | Mannlein et al. | 198/442 |
| 5,988,356 A | * | 11/1999 | Bonnet | 198/598 |

(Continued)

FOREIGN PATENT DOCUMENTS

DE    3444462 A1    6/1986

(Continued)

OTHER PUBLICATIONS

German Search Report for 102007062652.7, dated Jan. 15, 2008.

*Primary Examiner* — Douglas Hess
(74) *Attorney, Agent, or Firm* — Marshall, Gerstein & Borun LLP

(57) ABSTRACT

The invention relates to a method for product changeover in a filling plant and to a bugger system for carrying out the method. A first product is passed through a primary buffer and then a second product is initially buffer-stored in a secondary buffer, and so a clear separation of the products is achieved and a product changeover can be carried out in upstream and downstream production machines without production coming to a standstill.

17 Claims, 2 Drawing Sheets

U.S. PATENT DOCUMENTS

| | | | |
|---|---|---|---|
| 6,182,812 B1 * | 2/2001 | Hartness et al. | 198/364 |
| 6,810,645 B2 * | 11/2004 | Cerf | 53/531 |
| 6,895,730 B2 * | 5/2005 | Weaver et al. | 53/500 |
| 6,959,802 B1 * | 11/2005 | Garvey | 198/347.1 |
| 6,974,020 B1 * | 12/2005 | Peppel | 198/370.07 |
| 7,198,147 B2 * | 4/2007 | Petrovic | 198/452 |
| 7,322,459 B2 * | 1/2008 | Garvey | 198/461.1 |
| 7,353,955 B2 * | 4/2008 | Edwards | 209/552 |
| 7,766,153 B2 * | 8/2010 | Brugger et al. | 198/416 |
| 7,942,255 B2 * | 5/2011 | Seger et al. | 198/452 |

FOREIGN PATENT DOCUMENTS

| | | |
|---|---|---|
| DE | 9413209 U1 | 11/1994 |
| DE | 29913237 | 12/2000 |
| EP | 0310102 A1 | 4/1989 |
| JP | 2006117347 A | 5/2006 |
| NL | 7707169 A | 12/1977 |
| WO | WO-01/10754 A1 | 2/2001 |

* cited by examiner

ARTICLE BUFFER

The present invention is a National Stage of PCT/EP2008/010298, filed Dec. 4, 2008, which claims priority to German Patent Application No. 102007062652.7, filed Dec. 24, 2007.

FIELD OF THE DISCLOSURE

The present disclosure relates to a method for product changeover in a filling plant and to a buffer system for performing such a method, such as used in beverage bottling operations.

BACKGROUND

Product changeover e.g. in a beverage filling plant to a bottle with a different label normally requires production standstill. The production machine is here run empty, changed to a new label and started again. Standstill causes a gap in the production stream that can be used for subsequent machines, for instance a packaging machine, for changeover to a different packaging material, but the standstill period is lost as production time.

Solutions for solving the problem dealing with a decrease in downtimes have already been described in connection with malfunctions on production machines. For instance a method is known for automatically operating a buffer path, wherein bottles are diverted in case of an accumulation or jam in front of a labeling machine into a sidearm of the conveying path. After elimination of the malfunction and the jam, the sidearm is evacuated at an increased speed into the labeling machine whereas succeeding bottles are still passed into the sidearm. After all of the previously collected bottles have been transported out of the sidearm, inlet and outlet of the sidearm are closed, and normal operation is resumed. The number of the bottles remaining in the sidearm can be successively reduced by repeating the method.

Moreover, a bottle treatment facility is known in which a filling machine can be run empty in a controlled way so as to interrupt the feed stream to a defective labeling machine. For this purpose the filling machine is connected during normal operation through a first conveying path to the labeling machine. At the inlet of the conveying path a deflection device is arranged that in case of a malfunction of the labeling machine diverts the bottle stream into a second conveying path extending in parallel. At the same time a corresponding bottle stop at the downstream ends of the conveying paths is closed and the inflow of new bottles into the filling machine is interrupted. Thus the second conveying path serves to accommodate the bottles already positioned in the filling machine. After the malfunction has been eliminated, the bottle stop of the second conveying path is first opened and the bottles contained therein are passed into the labeling machine. Normal operation is resumed thereafter.

None of these known methods, however, can reduce or altogether avoid downtimes of the filling plant during product changeovers on a production machine.

SUMMARY OF THE DISCLOSURE

Hence, the present disclosure is based on the technical problem to find a remedy for this.

According to the invention this technical problem is solved by the following method steps:

a) supplying a first product into a primary buffer with a supply device, and discharging the first product out of the primary buffer with a discharge device;

c) transporting a second product from the supply device into a secondary buffer, and discharging the first product contained in the primary buffer with the discharge device;

e) discharging the second product contained in the secondary buffer with the discharge device; and f) supplying the second product into the primary buffer with the supply device, and discharging the second product out of the primary buffer with the discharge device.

This permits a clear-cut separation of the products in the production process and an operation of the supply means and the discharge means at different speeds, so as to adapt e.g. a fast machine with long changeover times to a slow machine with short changeover times.

Advantageously, before step c) an additional step b) may be carried out, in which a production machine that is arranged upstream when viewed from the supply device is changed over to the second product. This ensures that all units of the first product are supplied first and then all units of the second product.

Advantageously, it is possible that the upstream production machine is still in the production mode without any interruption during product changeover. This achieves a substantially continuous product stream during changeover. This minimizes downtimes, particularly on relatively slow machines.

Advantageously, product changeover in step b) can take place on a labeling machine. Labeling machines are particularly suited for a flying product change because they can be provided with a plurality of labeling units and can be switched over between the units during production without any interruption so as to obtain differently labeled articles.

Preferably, after the primary buffer has been emptied in step c), an additional step d) is carried out in which a production machine that is arranged downstream when viewed from the discharge device is changed over to the second product. This guarantees that the products can be further processed in a correct way.

Advantageously, the downstream production machine can be operated in the overcapacity mode in step e), so that the second product is discharged faster out of the secondary buffer than it has been introduced into the secondary buffer. It is thereby possible to compensate for a possibly needed standstill during product changeover in the case of a comparatively fast machine.

Advantageously, the product changeover in step d) may take place on a packaging machine. Packaging machines can be operated at a comparatively fast pace to compensate for downtimes.

Advantageously, at least two method steps are partly overlapping in time. Gaps in the product stream can thereby be reduced.

Advantageously, the supply device can be operated continuously. This permits an optimum utilization of the buffer system.

Furthermore, the underlying technical problem is solved according to the disclosure by a buffer system in which the gate at the inlet side can be connected to a control unit which changes the position of the gate if a second product is supplied to the buffer system instead of a first product. This permits a clear-cut separation of the products in the buffer system without any interruption of the production process, as well as different speeds of the supply means and the discharge means so as to adapt e.g. a fast machine with long changeover times to a slower machine with short changeover times.

In an advantageous embodiment the gate at the outlet side can be connected to a control unit which changes the position of the gate to discharge a second product out of the buffer system instead of a first product. This permits an automatic and correct changeover to the second product.

In a further advantageous embodiment the gate at the inlet side and the gate at the outlet side can be connected to a control unit that changes the respective position of the gates if the second product is to be discharged out of the primary buffer. This ensures a continuous product stream after the secondary buffer has been emptied.

A particularly advantageous embodiment may comprise a central conveying device arranged in parallel between the supply device and the discharge device, and an inner guide railing substantially arranged over the central conveying device, wherein the guide railing separates the primary buffer from the secondary buffer, so that at least one of the conveying devices forms both a portion of the primary buffer and a portion of the secondary buffer. With this arrangement it is possible to realize functional buffers by taking comparatively small technical and economic efforts.

Advantageously, the speed of the discharging conveying device is variable, so that the conveying capacity thereof can be adapted to the overcapacity of a downstream production machine. Downtimes of the production machine can thereby be compensated in an optimum way.

A particularly advantageous embodiment comprises a monitoring device at the inlet side that monitors whether a first product or a second product is supplied to the buffer system. The error rate of the gate at the inlet side can thereby be minimized.

A particularly advantageous embodiment comprises a monitoring device at the outlet side which monitors the fill level of the secondary buffer. A gap in the product stream of the second product can thereby be avoided if the secondary buffer is completely emptied.

Advantageously, the gate at the inlet side and the gate at the outlet side are each provided with a pivotable guide railing. This implements functional and inexpensive gates.

BRIEF DESCRIPTION OF THE DRAWINGS

An embodiment of the present disclosure is illustrated in the drawing and explained hereinafter.

DETAILED DESCRIPTION

Figure 1:
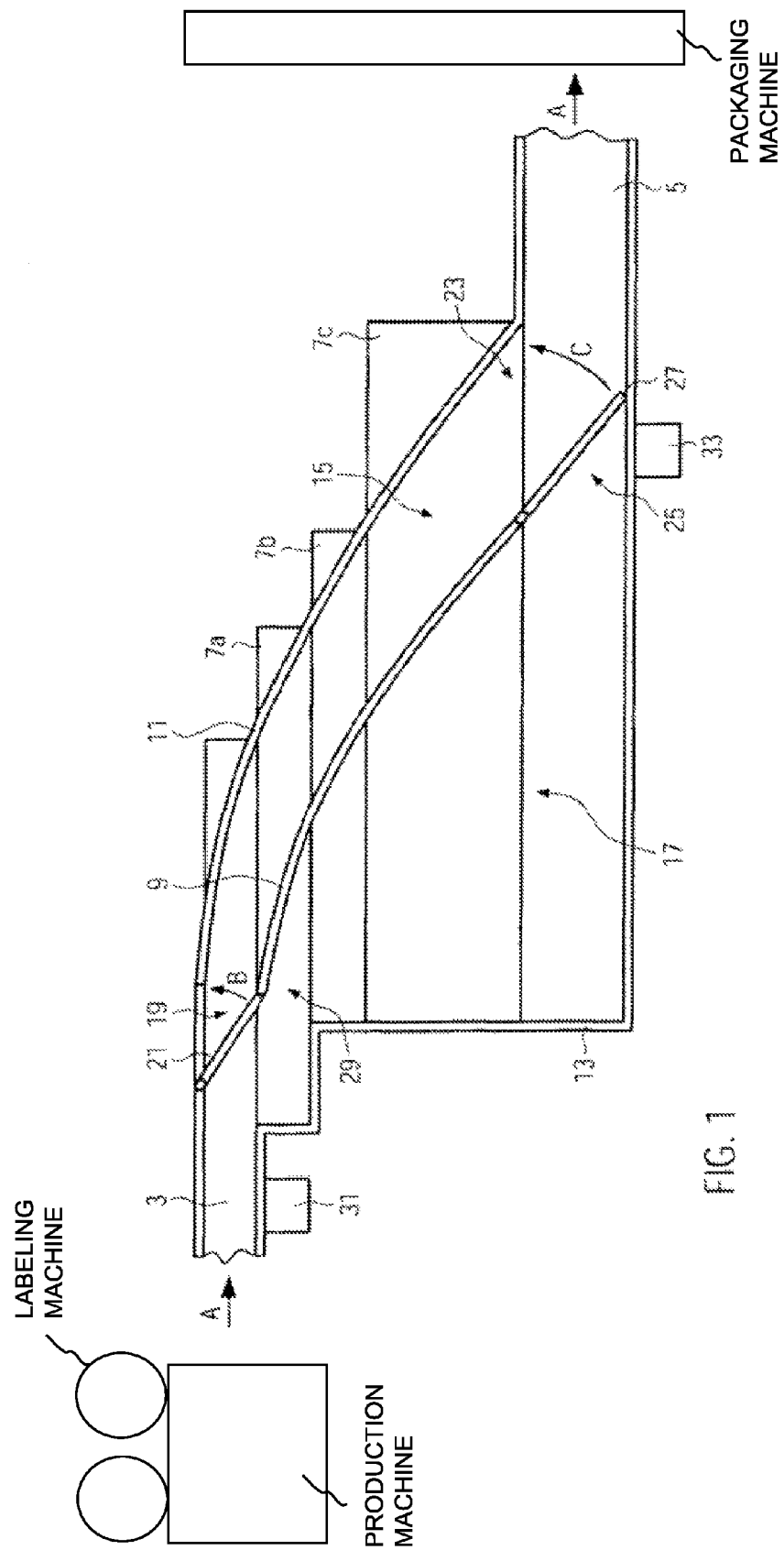
FIG. 1 is a schematic top view on an embodiment of a buffer system according to the disclosure.

The buffer system 1 as shown in FIG. 1 is preferably arranged between a labeling machine and a downstream handling machine, e.g. a packaging machine. The labeling machine may comprise at least two labeling units that can be switched over in the production mode without interruption and are used for applying different labels.

As shown in FIG. 1, the buffer system 1 comprises a supply device 3, a discharge means 5 extending substantially in parallel therewith, and a central conveying device 7a-7c arranged between the supply device and the discharge device. The conveying devices 3, 5 and 7a-7c are driven by motors (not shown) in a joint running direction, symbolized by arrow A, but at different speeds, if necessary. An inner guide railing 9 is arranged over the central conveying device 7a-7c in a direction oblique to the running direction. Moreover, an outer guide railing 11 extends on the outer rim of the conveying devices 3, 5 and 7a-7c. The frame of the buffer system is designated with 13.

The area of the conveying devices 3, 5 and 7a-7c that is defined by the inner guide railing 9 and the outer guide railing 11 forms a primary buffer 15, while the area of the conveying devices 3, 5 and 7a-7c defined by the inner guide railing 9 and the frame 13 forms the secondary buffer 17. Hence, the two buffers 15, 17 extend at least in part over the same conveying devices 3, 5 and 7a-7c.

At the section of the inlet portion 19 of the primary buffer 15, a gate 21 at the inlet side which is pivotable in the direction of arrow C is mounted on the guide railing 11. A further gate 27 at the outlet side which is pivotable in the direction of arrow C is located between the outlet portions 23 and 25, respectively, of the primary buffer 15 and the secondary buffer, respectively.

FIG. 1 shows the gate 21 in a position in which the supply device 3 is connected to the inlet portion 29 of the secondary buffer 17. By contrast, when the gate has been pivoted back, the containers (bottles) arriving at the supply belt enter the inlet portion 19 of the primary buffer 15.

Furthermore, in FIG. 1, the gate 27 at the outlet side is adjusted such that the outlet portion 25 of the secondary buffer 17 is closed. The gate, however, can also assume a position in which the outlet portion 25 of the secondary buffer 17 is open, i.e. connected to the discharge device 5.

A monitoring device 31 at the inlet side is arranged upstream of the gate 21, the monitoring device 31 detecting whether a first or a second product (not shown) is supplied. Furthermore, a monitoring device 33 at the outlet side is arranged at the level of the outlet portion 25 of the secondary buffer 17, the monitoring device detecting the fill level of the secondary buffer 17.

With this arrangement it is possible to realize separate buffers in a functional and economic way with a small number of conveying belts. The products can be neatly separated upon product change and serially discharged out of the buffers.

The conveying devices 3, 5 and 7a-7c are e.g. motor-driven conveying belts that jointly form a table-shaped buffer area. The central conveying device 7a-7c, however, need not, as shown in FIG. 1, consist of three conveying belts. Depending on the size and shape of the buffers 15, 17, a combination of a greater or smaller number of conveying belts is possible. In FIG. 1 the primary buffer 15 extends substantially over the conveying devices 3 and 7a-7c and the secondary buffer 17 substantially over the conveying devices 5 and 7a-7c. This division, however, is not imperative. It is advantageous that at least one of the conveying devices 3, 5, 7a, 7b and 7c forms both a portion of the primary buffer 15 and a portion of the secondary buffer 17.

Furthermore, the conveying belts 3, 5 and 7a-7b may have different speeds. At least the speed of the discharge device 5 is variable.

As an alternative to conveying belts, other, possibly also additional, conveying devices are also conceivable. Hence, both the dwell period of the products in the buffers 15, 17 and the speeds of the conveying devices 3, 5 and 7a-7c can be flexibly adapted to the speeds or changeover breaks of upstream or downstream production machines.

The guide railings 9 and 11 as well as the frame 13 may e.g. be formed from a material and profile particularly suited for deflecting and guiding the respective product.

The gate 27 is preferably fastened to the inner guide railing 9. It can, however, also be fastened to the frame 13. It is decisive that it can act as a bottle stop for the secondary buffer 17. The gates 21 and 27 are switched over automatically by means of a control unit (not shown in more detail).

The monitoring devices 31, 33 contain suitable sensors and may e.g. be optical or mechanical barriers. The signal of the monitoring device 31 at the inlet side can also be matched for example with a production machine arranged upstream thereof so as to assign products in a correct way.

With reference to the diagrams shown in FIGS. 2 and 3, it will be described hereinafter how with the buffer system according to the disclosure the method according to the disclosure can be carried out.

Figure 2:
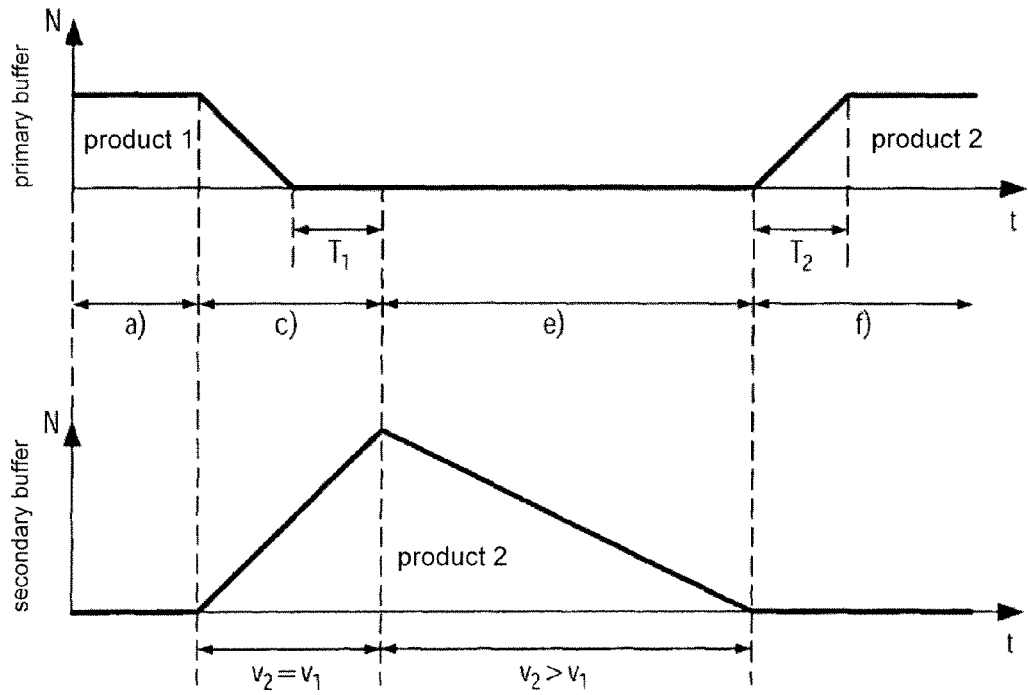
FIG. 2 shows the time progress of the product quantities in the primary buffer and in the secondary buffer in the method according to the disclosure as a schematic diagram.

FIG. 2 shows the progress of the product quantities N of a first product and of a second product in the primary buffer 15 (top) and in the secondary buffer 17 (bottom) during method steps a), c), e) and f) along time axis t.

The products to be conveyed are e.g. bottles or other beverage containers with different labels. The products, however, can also differ from one another in other features.

The supply device 3 is continuously operated during the whole method, so that both products are supplied continuously and at a preferably constant speed $v_1$ during the respective method steps. Discharge takes place at speed $v_2$ with the discharge device 5, with the discharge speed being also dependent on the supply speed. If necessary, a discontinuous supply and/or a variable supply speed is/are also possible. In this instance the discharge speed must be adapted to the supply speed in a corresponding way.

In method step a) a first product is first supplied into the primary buffer 15 and discharged again from the buffer at the same speed ($v_1=v_2$). Therefore, a quantity of the first product, which is constant on average, is positioned in the primary buffer 15. The secondary buffer 17 is empty. Method step a) ends with the supply of the last unit of the first product.

Method step c) begins with the supply of the first unit of a second product. Said product is transported from the supply device with the help of the gate 21 into the secondary buffer 17, the outlet of which is first closed by the gate 27. The quantity of the second product in the secondary buffer 17 is therefore increasing continuously. The first product still contained in the primary buffer is simultaneously transported away until the primary buffer 15 has become empty. Even after evacuation of the primary buffer 15, the second product is still supplied into the secondary buffer 7, but not discharged from said buffer. This creates a discharge break $T_1$ lasting until the end of step c), during which no products are discharged. During the discharge break $T_1$, the second product, however, is still fed into the secondary buffer 17.

Method step e) starts with the discharge of the second product out of the secondary buffer 17, the outlet of which is opened for this purpose by switching the gate 21. As shown in FIG. 2, the quantity of the second product in the secondary buffer 17 will then decrease continuously in this method step although the second product is still supplied at speed $v_1$ because the discharge speed $v_2$ in step e) is chosen to be at least temporarily higher than the supply speed $v_1$ ($v_1>v_2$). Step e) is completed if the second product has been entirely discharged out of the secondary buffer 17. The outlet of the secondary buffer 17 can then be closed again by switching the gate 27.

Method step f) begins with the supply of the second product into the primary buffer 15. To this end the gate 21 is reset again, so that products are no longer introduced into the secondary buffer 17. After a discharge break $T_2$, which is needed by the first supplied unit of the second product to pass through the primary buffer 15, the second product is supplied and discharged, as has been described above for the first product under step a).

With the above-described method two products that are supplied one after the other and substantially continuously are reliably separated. The discharge break $T_1$ at the end of step c) can be used for changing a downstream production machine to the second product. It is here possible to compensate for the discharge break $T_1$ subsequently by an increased discharge speed, so that the supply of the products need not be interrupted.

Figure 3:
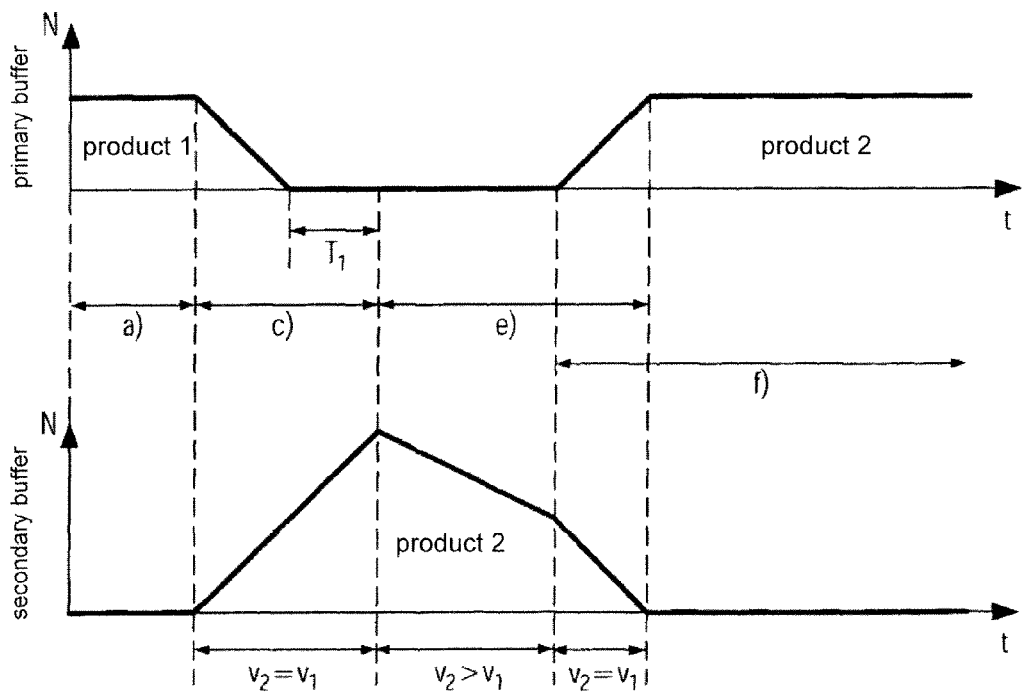
FIG. 3 shows the time progress of the product quantities in the primary buffer and in the secondary buffer of a variant of the method according to the disclosure as a schematic diagram.

FIG. 3 shows a variant of the above-described method in which steps e) and f) overlap. The second discharge break $T_2$ can thereby be avoided. What is also shown is a change in the discharge speed $v_2$ during step e), wherein the change in speed coincides with the beginning of step f). Any desired combinations of the variants shown in FIGS. 2 and 3 are however possible, such as e.g. more complex changes in speed $v_2$ or different overlap times. A temporary adaptation of the discharge speed in step f) is also conceivable so as to adapt e.g. the fill level of the primary buffer. To this end the speeds of the conveying means 3, 5 and 7a-7c could e.g. be staggered in an appropriate way.

Before step c) a labeling machine that is arranged upstream when viewed from the supply device 3 is changed over to the second product in a step b) (not shown). Special machines permitting a flying label change are suited for this, so that the labeling machine does not have to be run empty for a product change. This permits a continuous supply of the products. Step b) can overlap with step a) to ensure a supply without any gaps, if possible. Product changeover in step b) can also be carried out on a different production machine, if necessary.

After the primary buffer 15 has been emptied in step c), a packaging machine that is arranged downstream when viewed from the discharge device 5 is changed over to the second product in a step d) (not shown). Machines with an adequate overcapacity are particularly suited for this so that they can be operated during step e) in an overcapacity mode so as to discharge the second product more rapidly out of the secondary buffer 17 than it has been introduced into the secondary buffer 17. A product changeover in step d) can also be carried out on a different production machine, if necessary.

The method permits a product change with a reliable separation of the products and a minimal production delay, particularly in combination with an upstream production machine without any changeover break and an upstream production machine faster in relation therewith a changeover break.

The invention claimed is:

1. A method for product changeover in a filling plant:
    a) supplying a first product into a primary buffer with a supply device, and discharging the first product out of the primary buffer with a discharge device;
    c) transporting a second product from the supply device into a secondary buffer, and simultaneously discharging the first product contained in the primary buffer with the discharge device until the primary buffer is empty;
    e) discharging the second product contained in the secondary buffer with the discharge device; and
    f) supplying the second product into the primary buffer with the supply device, and discharging the second product out of the primary buffer with the discharge device.

2. The method according to claim 1, and an additional step b) before step c), wherein a production machine that is arranged upstream when viewed from the supply device is changed over to the second product.

3. The method according to claim 2, wherein the upstream production machine continues its production during product changeover.

4. The method according to claim 2, wherein the product changeover in step b) takes place on a labeling machine.

5. The method according to claim 1, and an additional step d) which is carried out after the primary buffer has been emptied in step c), and in which a production machine that is arranged downstream when viewed from the discharge device is changed over to the second product.

6. The method according to claim 5, wherein the downstream production machine is operated in an overcapacity mode during step e), so that the second product is discharged more rapidly out of the secondary buffer than it has been introduced into the secondary buffer.

7. The method according to claim 5, wherein the product changeover in step d) is carried out on a packaging machine.

8. The method according to claim 1, wherein at least two method steps are partly overlapping in time.

9. The method according to claim 1, wherein the supply device is operated continuously.

10. A buffer system for carrying out the method according to claim 1 for product changeover in a filling plant, the system comprising:
- a supply device and a discharge device;
- a primary buffer arranged between the supply device and the discharge device;
- a secondary buffer arranged between the supply device and the discharge device and next to the primary buffer;
- a gate at the inlet side with a first position in which the supply device is connected to the inlet portion of the primary buffer, and with a second position in which the supply device is connected to the inlet portion of the secondary buffer;
- a gate at the outlet side with a first position in which the outlet portion of the secondary buffer is not connected to the discharge device, and with a second position in which the outlet portion of the secondary buffer is connected to the discharge device,
- the gate at the inlet side can be connected to a control unit for changing the position of the gate if a second product is supplied to the buffer system instead of a first product, and
- the buffer system is configured for transporting the second product into the secondary buffer and simultaneously discharging the first product from the primary buffer until the primary buffer is empty.

11. The buffer system according to claim 10, wherein the gate at the outlet side can be connected to a control unit for changing the position of the gate to discharge a second product out of the buffer system instead of a first product.

12. The buffer system according to claim 10, wherein the gate at the inlet side and the gate at the outlet side can be connected to a control unit that changes the respective position of the gates if the second product is to be discharged out of the primary buffer instead of the secondary buffer.

13. The buffer system according to claim 10, and
- a central conveying device arranged in parallel between the supply device and the discharge device; and
- an inner guide railing substantially arranged over the central conveying device,
- wherein the guide railing separates the primary buffer from the secondary buffer, so that at least one of the conveying devices form both a portion of the primary buffer and a portion of the secondary buffer.

14. The buffer system according to claim 10, wherein the speed of the discharge device is variable, so that the conveying capacity thereof can be adapted to the overcapacity of a downstream production machine.

15. The buffer system according to claim 10, and a monitoring device at the inlet side that monitors whether a first product or a second product is supplied to the buffer system.

16. The buffer system according to claim 10, and a monitoring device at the outlet side that monitors the fill level of the secondary buffer.

17. The buffer system according to claim 10, wherein the gate at the inlet side and the gate at the outlet side are each provided with a pivotable guide railing.

* * * * *

UNITED STATES PATENT AND TRADEMARK OFFICE
CERTIFICATE OF CORRECTION

PATENT NO. : 8,196,733 B2  
APPLICATION NO. : 12/810063  
DATED : June 12, 2012  
INVENTOR(S) : Hahn Page 1 of 1

It is certified that error appears in the above-identified patent and that said Letters Patent is hereby corrected as shown below:

On the Title Page, in item (57), under "ABSTRACT", in Column 2, Line 2, delete "bugger" and insert -- buffer --.

Signed and Sealed this  
Twenty-third Day of September, 2014

Michelle K. Lee  
*Deputy Director of the United States Patent and Trademark Office*